(12) United States Patent
Maeda et al.

(10) Patent No.: US 8,521,322 B2
(45) Date of Patent: Aug. 27, 2013

(54) AUTOMATIC PROGRAMMING METHOD AND DEVICE FOR CREATING MULTI-PATH PROGRAM

(75) Inventors: Hideaki Maeda, Yamanashi (JP); Shinya Nakamura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/033,874

(22) Filed: Feb. 24, 2011

(65) Prior Publication Data

US 2011/0257781 A1     Oct. 20, 2011

(30) Foreign Application Priority Data

Apr. 16, 2010   (JP) ................................. 2010-095507

(51) Int. Cl.
- *G06F 19/00* (2006.01)
- *G05B 19/18* (2006.01)
- *G05B 19/04* (2006.01)

(52) U.S. Cl.
USPC ............... 700/186; 700/2; 700/184; 700/190; 700/253

(58) Field of Classification Search
USPC ......... 700/2, 7, 18–19, 23, 61, 174, 186–187, 700/189, 190, 194
See application file for complete search history.

(56) References Cited

U.S. PATENT DOCUMENTS

| | | | |
|---|---|---|---|
| 5,495,430 A * | 2/1996 | Matsunari et al. ................. | 703/6 |
| 5,870,306 A | 2/1999 | Harada | |
| 5,933,353 A * | 8/1999 | Abriam et al. ................. | 700/182 |
| 6,728,657 B2 * | 4/2004 | Nakamura ..................... | 702/178 |
| 7,027,889 B2 * | 4/2006 | Nakamura ..................... | 700/181 |
| 2003/0110006 A1 * | 6/2003 | Nakamura ..................... | 702/176 |
| 2005/0038552 A1 * | 2/2005 | Sagawa et al. ................. | 700/181 |
| 2005/0228533 A1 * | 10/2005 | Hioki et al. ................... | 700/159 |
| 2007/0241710 A1 * | 10/2007 | Shibui et al. .................. | 318/552 |
| 2008/0281463 A1 * | 11/2008 | Suh et al. ....................... | 700/182 |
| 2009/0198370 A1 * | 8/2009 | Nishi et al. ..................... | 700/184 |
| 2011/0257781 A1 * | 10/2011 | Maeda et al. ................. | 700/186 |

FOREIGN PATENT DOCUMENTS

| | | |
|---|---|---|
| CN | 1737716 A | 2/2006 |
| CN | 101840217 A | 9/2010 |
| JP | 7068448 | 3/1995 |
| JP | 8025176 A | 1/1996 |
| JP | 1086040 | 4/1998 |

OTHER PUBLICATIONS

Office Action issued in Chinese Application No. 201110064848.7, dated Feb. 4, 2013.

* cited by examiner

*Primary Examiner* — Kavita Padmanabhan
*Assistant Examiner* — Darrin Dunn
(74) *Attorney, Agent, or Firm* — Lowe, Hauptman & Ham

(57) ABSTRACT

In automatic programming for creating a multi-path program for a machine having a plurality of control paths performing one or more machining processes of a machining program for machining a workpiece, the machining time of each of the machining processes is calculated, workable paths are input for each of the machining processes, and then workable orders of the machining processes are input. For each of the machining processes, simultaneously workable machining processes are input if any among other machining processes. On the basis of the above results, machining programs that provide the shortest machining time are selected.

2 Claims, 18 Drawing Sheets

2-PATH LATHE (ONE SPINDLE)

2-PATH LATHE (ONE SPINDLE) WITH MILLING HEAD

2-PATH LATHE (TWO SPINDLES)

2-PATH LATHE (TWO SPINDLES)

2-PATH LATHE (TWO SPINDLES) WITH MILLING HEAD

3-PATH LATHE (TWO SPINDLES)

3-PATH LATHE (TWO SPINDLES) WITH MILLING HEAD

4-PATH LATHE (TWO SPINDLES)

| MACHINING PROCESS | | MACHINING PROCESS WORKING CONDITIONS | | | |
|---|---|---|---|---|---|
| NO. | MACHINING TYPE | WORKABLE ORDER | WORKABLE PATH | | SIMULTANEOUSLY WORKABLE MACHINING PROCESS |
| | | | PATH1 | PATH2 | |
| (1) | OUTER ROUGHING | FIRST | ○ | × | |
| (2) | OUTER GROOVING | AFTER(1) | ○ | ○ | (3)、(4) |
| (3) | OUTER ROUGHING | AFTER(1) | × | ○ | (2) |
| (4) | OUTER GROOVING | AFTER(3) | × | ○ | (2) |

FIG. 10

(a) INPUT TO PROCESS
- $n$ = TOTAL NUMBER OF MACHINING PROCESSES
- CONDITIONS FOR WORKABLE ORDERS OF MACHINING PROCESSES
- $h$ = NEST COUNTER & SEQUENCE NUMBER($h$ = 1, 2, 3, $\cdots$)

(b) SEQUENCE BUFFER (SEQUENCE BUFFER FOR NEST 1)

| h | PROCESS NUMBER |
|---|---|
| 1 | |
| 2 | |
| ~ | |
| n | |

(SEQUENCE BUFFER FOR NEST 2)

| h | PROCESS NUMBER |
|---|---|
| 1 | |
| 2 | |
| ~ | |
| n | |

$\cdots$ (c) STORAGE AREAS FOR DETERMINED WORKING SEQUENCES (DETERMINED WORKING SEQUENCE 1)

| No. | PROCESS NUMBER |
|---|---|
| 1 | |
| 2 | |
| ~ | |
| n | |

(DETERMINED WORKING SEQUENCE 2)

| No. | PROCESS NUMBER |
|---|---|
| 1 | |
| 2 | |
| ~ | |
| n | |

$\cdots$

FIG. 12

(a) INPUTS TO PROCESS
- n = TOTAL NUMBER OF MACHINING PROCESSES
- WORKING SEQUENCE((1), (2), (3), ···)
- CONDITIONS FOR WORKABLE PATHS FOR MACHINING PROCESSES
- j = NEST COUNTER & SEQUENCE NUMBER(j=1, 2, 3, ···)

(b) MACHINING PATH BUFFER (MACHINING PATH BUFFER FOR NEST 1)

| j | PROCESS NUMBER | WORKING PATH |
|---|---|---|
| 1 | | |
| 2 | | |
| ~ | | |
| n | | |

(MACHINING PATH BUFFER FOR NEST 2)

| j | PROCESS NUMBER | WORKING PATH |
|---|---|---|
| 1 | | |
| 2 | | |
| ~ | | |
| n | | |

···

(c) STORAGE AREAS FOR DETERMINED WORKING PATHS (DETERMINED WORKING PATH 1)

| No. | PROCESS NUMBER | WORKING PATH |
|---|---|---|
| 1 | | |
| 2 | | |
| ~ | | |
| n | | |

(DETERMINED WORKING PATH 2)

| No. | PROCESS NUMBER | WORKING PATH |
|---|---|---|
| 1 | | |
| 2 | | |
| ~ | | |
| n | | |

···

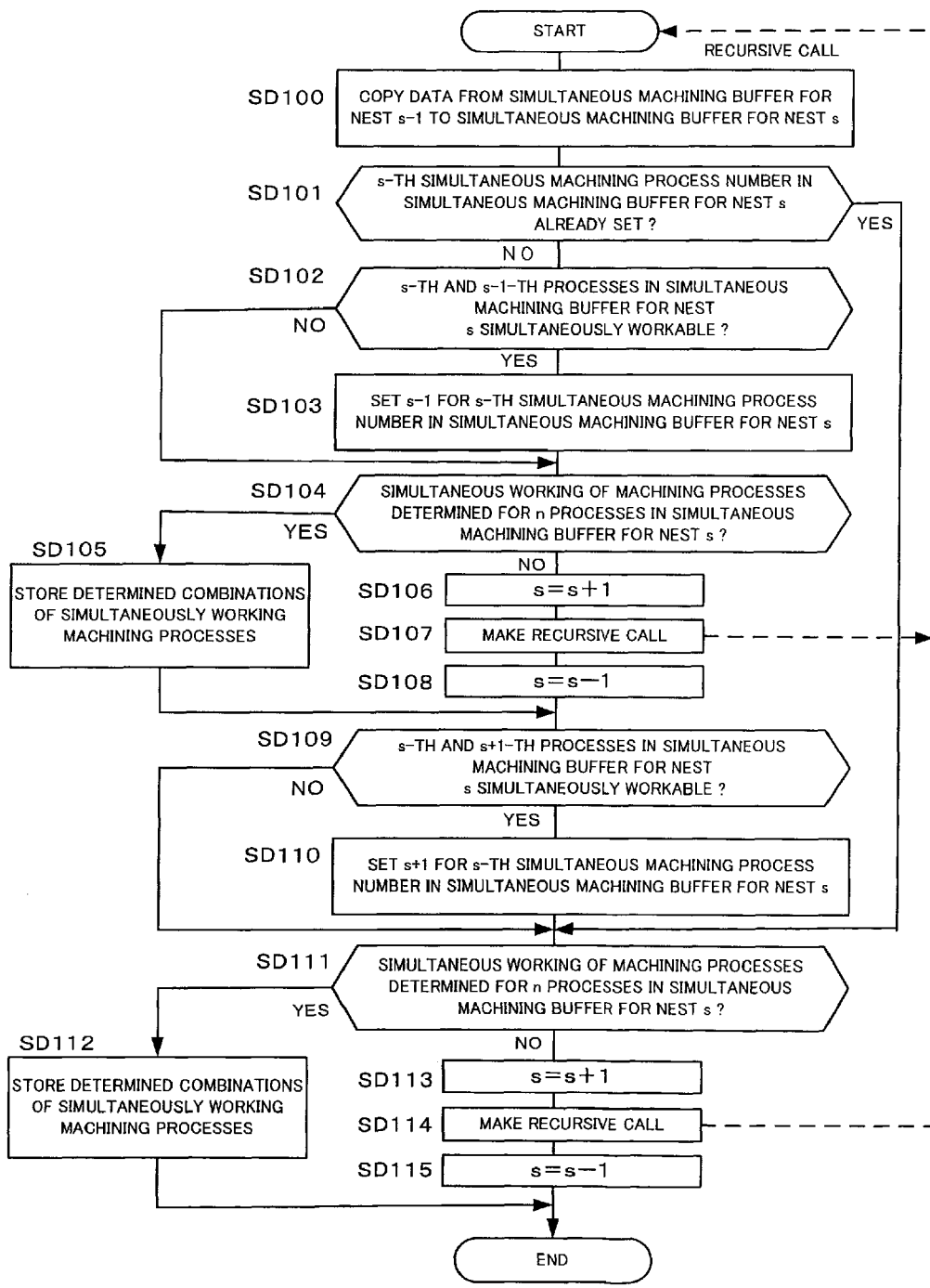

FIG. 14

(a) INPUTS TO PROCESS

- n = TOTAL NUMBER OF MACHINING PROCESSES
- WORKING SEQUENCES AND WORKING PATHS
- CONDITIONS FOR WORKABLE PATH COMBINATIONS
- s = NEST COUNTER & SEQUENCE NUMBER (s = 1, 2, 3, ···)

(b) SIMULTANEOUS MACHINING BUFFER

| (SIMULTANEOUS MACHINING BUFFER FOR NEST 1) | | | |
|---|---|---|---|
| s | PROCESS NUMBER | WORKING PATH | SIMULTANEOUSLY WORKING PROCESS NUMBER |
| 1 | | | |
| 2 | | | |
| ~ | | | |
| n | | | |

...

(c) STORAGE AREA FOR DETERMINED SIMULTANEOUSLY WORKING PROCESSES

| (DETERMINED SIMULTANEOUSLY WORKING PROCESSES 1) | | | |
|---|---|---|---|
| No. | PROCESS NUMBER | WORKING PATH | SIMULTANEOUSLY WORKING PROCESS NUMBER |
| 1 | | | |
| 2 | | | |
| ~ | | | |
| n | | | |

| 1 | 2 | 3 | 4 | CONDITIONS MET ○=YES/×=NO | |
|---|---|---|---|---|---|
| (1) | (2) | (3) | (4) | ○ | 1 |
| | | (4) | (3) | × | 2 |
| | (3) | (2) | (4) | ○ | 3 |
| | | (4) | (2) | ○ | 4 |
| | (4) | (2) | (3) | × | 5 |
| | | (3) | (2) | × | 6 |
| (2) | (1) | (3) | (4) | × | 7 |
| | | (4) | (3) | × | 8 |
| | (3) | (1) | (4) | × | 9 |
| | | (4) | (1) | × | 10 |
| | (4) | (1) | (3) | × | 11 |
| | | (3) | (1) | × | 12 |
| (3) | (1) | (2) | (4) | × | 13 |
| | | (4) | (2) | × | 14 |
| | (2) | (1) | (4) | × | 15 |
| | | (4) | (1) | × | 16 |
| | (4) | (1) | (2) | × | 17 |
| | | (2) | (1) | × | 18 |
| (4) | (1) | (2) | (3) | × | 19 |
| | | (3) | (2) | × | 20 |
| | (2) | (1) | (3) | × | 21 |
| | | (3) | (1) | × | 22 |
| | (3) | (1) | (2) | × | 23 |
| | | (2) | (1) | × | 24 |

| PATH 1 | PATH 2 |
|---|---|
| MACHINING PROCESS(1) | |
| MACHINING PROCESS(2) | |
| | MACHINING PROCESS(3) |
| | MACHINING PROCESS(4) |

(B) (1−2)

| PATH 1 | PATH 2 |
|---|---|
| MACHINING PROCESS(1) | |
| | MACHINING PROCESS(2) |
| | MACHINING PROCESS(3) |
| | MACHINING PROCESS(4) |

(C) (3−1)

| PATH 1 | PATH 2 |
|---|---|
| MACHINING PROCESS(1) | |
| | MACHINING PROCESS(3) |
| | MACHINING PROCESS(2) |
| | MACHINING PROCESS(4) |

(D) (3−2)

| PATH 1 | PATH 2 |
|---|---|
| MACHINING PROCESS(1) | |
| | MACHINING PROCESS(3) |
| MACHINING PROCESS(2) | |
| | MACHINING PROCESS(4) |

(E) (4−1)

| PATH 1 | PATH 2 |
|---|---|
| MACHINING PROCESS(1) | |
| | MACHINING PROCESS(3) |
| | MACHINING PROCESS(4) |
| | MACHINING PROCESS(2) |

(F) (4−2)

| PATH 1 | PATH 2 |
|---|---|
| MACHINING PROCESS(1) | |
| | MACHINING PROCESS(3) |
| | MACHINING PROCESS(4) |
| MACHINING PROCESS(2) | |

| PATH 1 | PATH 2 |
|---|---|
| MACHINING PROCESS(1) | |
| MACHINING PROCESS(2) | MACHINING PROCESS(3) |
| | MACHINING PROCESS(4) |

(B) (3−2−1)

| PATH 1 | PATH 2 |
|---|---|
| MACHINING PROCESS(1) | |
| | MACHINING PROCESS(3) |
| MACHINING PROCESS(2) | MACHINING PROCESS(4) |

(C) (1−1−2)

| PATH 1 | PATH 2 |
|---|---|
| MACHINING PROCESS(1) | |
| MACHINING PROCESS(2) | MACHINING PROCESS(3) |
| | MACHINING PROCESS(4) |

| PATH 1 | PATH 2 | MACHINING TIME (s) |
|---|---|---|
| MACHINING PROCESS(1) | | 100 |
| MACHINING PROCESS(2) | MACHINING PROCESS(3) | 50 |
| | MACHINING PROCESS(4) | 50 |

(B) (3-2-1-1)

| PATH 1 | PATH 2 | MACHINING TIME (s) |
|---|---|---|
| MACHINING PROCESS(1) | | 100 |
| | MACHINING PROCESS(3) | 30 |
| MACHINING PROCESS(2) | MACHINING PROCESS(4) | 50 |

(C) (1-1-2-2)

| PATH 1 | PATH 2 | MACHINING TIME (s) |
|---|---|---|
| MACHINING PROCESS(1) | | 100 |
| MACHINING PROCESS(2) | MACHINING PROCESS(3) | 80 |
| | MACHINING PROCESS(4) | |

| PATH 1 | PATH 2 | MACHINING TIME(s) |
|---|---|---|
| MACHINING PROCESS(1) | | 100 |
| | MACHINING PROCESS(3) | 30 |
| MACHINING PROCESS(2) | MACHINING PROCESS(4) | 50 |

(C)                                      (1-1-2-2)

| PATH 1 | PATH 2 | MACHINING TIME(s) |
|---|---|---|
| MACHINING PROCESS(1) | | 100 |
| MACHINING PROCESS(2) | MACHINING PROCESS(3) MACHINING PROCESS(4) | 80 |

__US 8,521,322 B2__

AUTOMATIC PROGRAMMING METHOD AND DEVICE FOR CREATING MULTI-PATH PROGRAM

RELATED APPLICATIONS

The present application is based on, and claims priority from, Japanese Application Number 2010-095507, filed Apr. 16, 2010, the disclosure of which is hereby incorporated by reference herein in its entirety.

BACKGROUND OF THE INVENTION

1. Field of the Invention

The present invention relates to an automatic programming method and device for creating multi-path programs.

2. Description of the Related Art

To create a multi-path machining program that provides the shortest machining time, the operator should perform complicated calculation to determine the following three items:

(1) paths that perform machining processes in the shortest machining time;

(2) machining process orders that provide the shortest machining time; and (3) machining processes to be simultaneously performed.

Japanese Patent Application Laid-Open No. 10-086040 discloses a technique for creating programs for a multi-path machine tool by automatically creating information of (1) a path workable for each of the machining processes, (2) a machining process order in each path, and (3) an inter-path waiting order, on the basis of information of workable tools in each path, workpiece information for each machining process, and a path priority decision rule. This technique, however, cannot create a program that provides the shortest machining time.

On the other hand, Japanese Patent Application Laid-Open No. 07-068448 discloses a technique for enabling simultaneous machining by determining the machining order that provides the shortest machining time and automatically adjusting the cutting-in amount in the machining processes that cannot be simultaneously performed. In this technique, however, the order of machining processes and the paths performing the machining processes are predetermined and cannot be automatically determined. Furthermore, this technique only determines a combination of simultaneously performed machining processes that provides the shortest machining time and cannot change the order of machining processes or change the working paths. This technique also has a problem that a machining program that provides the shortest machining time should be searched for through a trial-and-error process of changing the order and calculating the machining time each time.

SUMMARY OF THE INVENTION

In view of the problems with the conventional techniques described above, an object of the present invention is to provide an automatic programming device that can create multi-path machining programs that provide the shortest machining time by creating all machining programs that meet three condition to be input by the operator which include (1) workable paths for each machining process, (2) workable orders of machining processes, and (3) simultaneously workable machining processes, and selecting machining programs that provide the shortest machining time on the basis of the machining time of each machining process.

To achieve the above object, an automatic programming device according to the present invention creates multi-path programs for a machine having a plurality of control paths performing one or more machining processes of a machining program for machining a workpiece. This automatic programming device includes machining process creating means for creating machining processes for machining a workpiece, calculating means for calculating the machining time of each machining process, path input means for inputting paths workable for each of the machining processes created by the machining process creating means, machining order input means for inputting workable orders of the machining processes, simultaneously workable machining process input means for inputting, for each of the machining processes, simultaneously workable machining processes if any among the other machining processes, and selecting means for selecting machining programs that provide the shortest machining time on the basis of the machining processes created by the machining process creating means, the machining time calculated by the calculating means, the workable paths input by the path input means, the workable machining orders input by the machining order input means, and the simultaneously workable machining processes input by the simultaneously workable machining process input means.

An automatic programming method according to the present invention creates multi-path programs for a machine having a plurality of control paths performing one or more machining processes of a machining program for machining a workpiece. This method includes the steps of:

(1) creating machining processes for machining a workpiece;

(2) calculating the machining time of each of the machining processes;

(3) inputting paths workable for each of the machining processes created by the machining process creating means;

(4) inputting workable orders of the machining processes;

(5) inputting, for each of the machining processes, simultaneously workable machining processes if any among the other machining processes; and (6) selecting machining programs that provide the shortest machining time on the basis of the machining processes created in the step (1), the machining time calculated in the step (2), the workable paths input in the step (3), the workable machining orders input in the step (4), and the simultaneously workable machining processes input in the step (5).

The present invention can thus provide an automatic programming device and method that can create multi-path machining programs that provide the shortest machining time by creating all machining programs that meet the three condition to be input by the operator, i.e., paths workable for each machining process, workable orders of the machining processes, and simultaneously workable machining processes, and selecting machining programs that provide the shortest machining time on the basis of the machining time of each machining process.

BRIEF DESCRIPTION OF THE DRAWINGS

The above and other objects and features of the present invention will become apparent from the following description of embodiments with reference to the accompanying drawings, in which:

FIG. 10 illustrates inputs to the processing for executing the flowchart shown in FIG. 9, sequence buffers created in storage areas, and storage areas for storing determined working sequences;

FIG. 12 illustrates inputs to the processing for executing the flowchart shown in FIG. 11, working path buffers created in storage areas, and storage areas for storing determined working paths;

FIG. 13 is a flowchart illustrating an algorithm for the processing of computing all the combinations of machining processes that are simultaneously workable, if possible, with the previous and/or following machining process thereof;

FIG. 14 illustrates inputs to the processing for executing the flowchart shown in FIG. 13, a simultaneous machining buffer created in a storage area, and a storage area for storing determined simultaneously workable machining processes;

FIG. 15 illustrates how all the combinations of working sequences that meet the conditions for workable orders are determined;

FIG. 16 illustrates how all the combinations of paths working on the machining processes are computed;

FIG. 17 illustrates how all the combinations of machining processes that are simultaneously performed, if possible, with the previous and/or following process thereof are computed;

FIG. 18 illustrates how the machining time of each machining process is determined; and FIG. 19 illustrates how the machining programs that provide the shortest machining time are selected.

DETAILED DESCRIPTION OF THE PREFERRED EMBODIMENTS

Figure 1A:
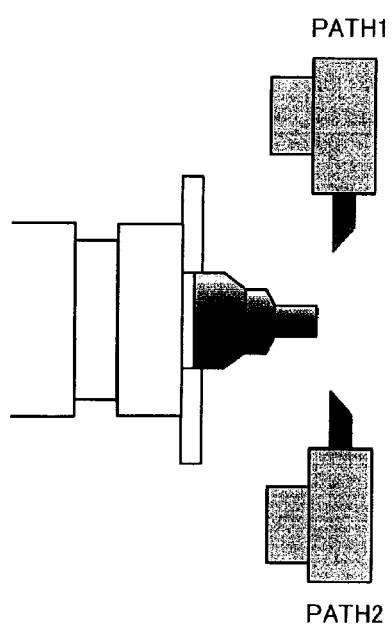
FIG. 1A illustrates a two-path lathe (one spindle)
Figure 1B:
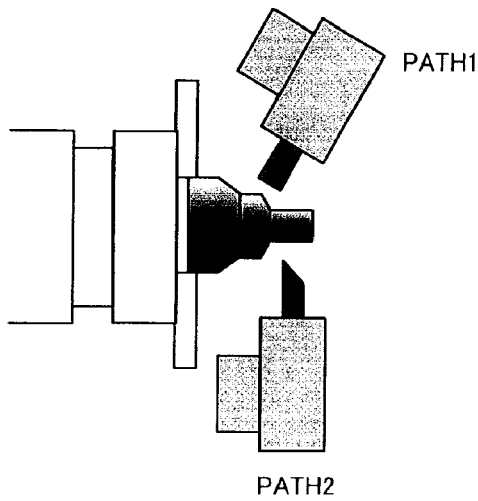
FIG. 1B illustrates a two-path lathe (one spindle) with a milling head.
Figure 1C:
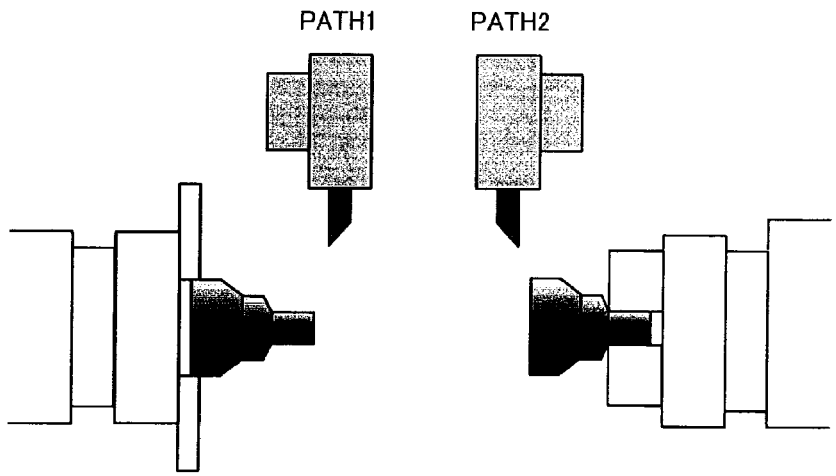
FIG. 1C illustrates a two-path lathe (two spindles)
Figure 2A:
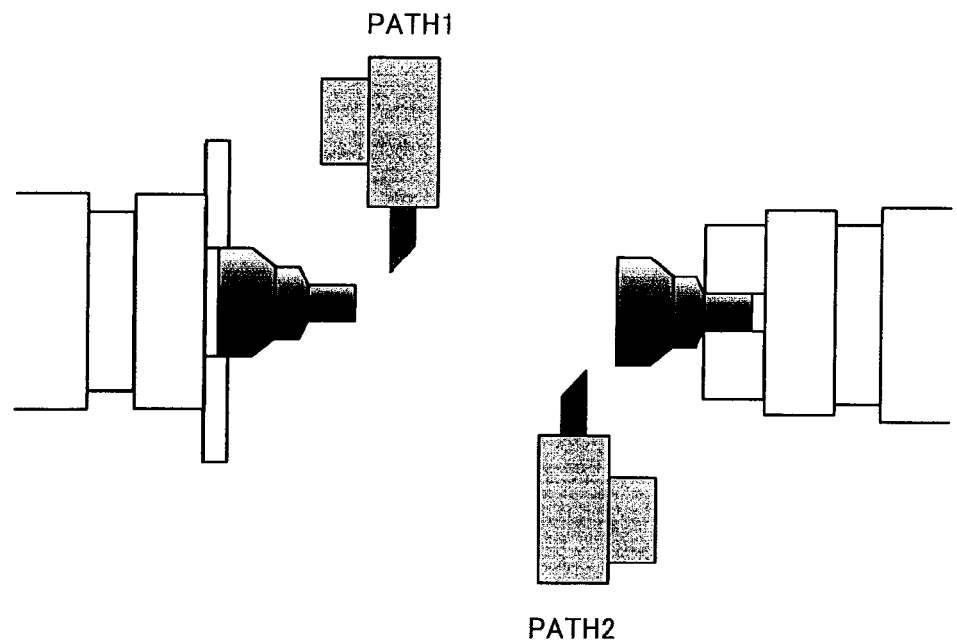
FIG. 2A illustrates a two-path lathe (two spindles)
Figure 2B:
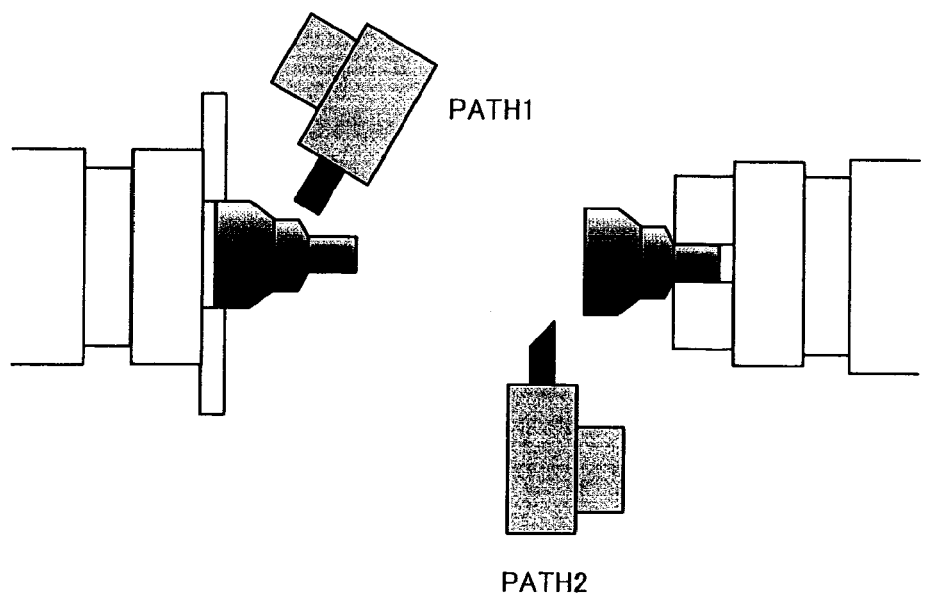
FIG. 2B illustrates a two-path lathe (two spindles) with a milling head.
Figure 3A:
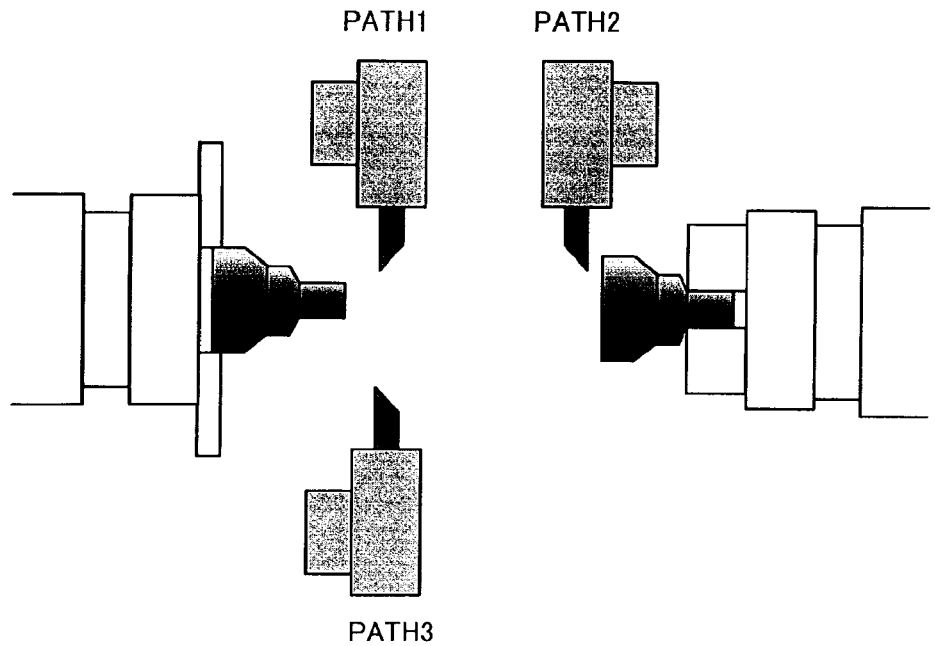
FIG. 3A illustrates a three-path lathe (two spindles)
Figure 3B:
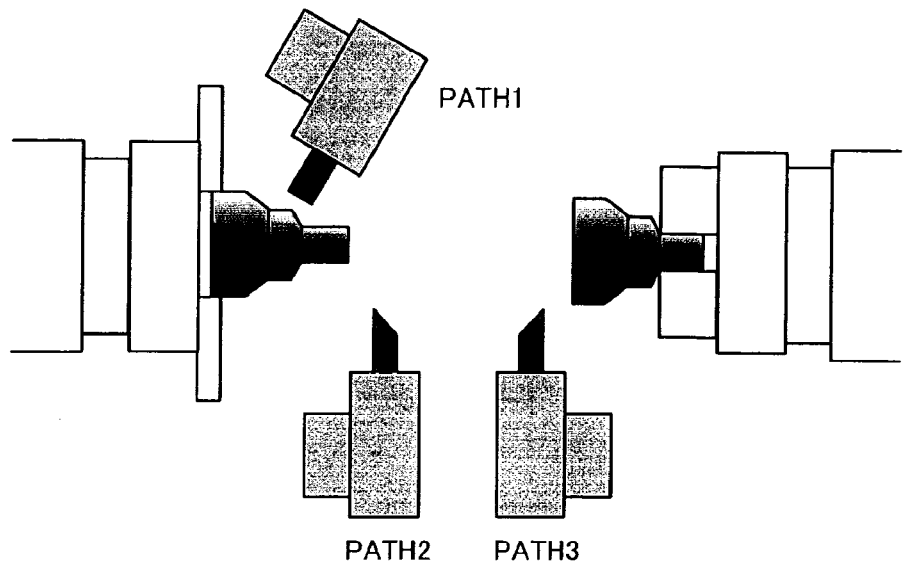
FIG. 3B illustrates a three-path lathe (two spindles) with a milling head.
Figure 4:
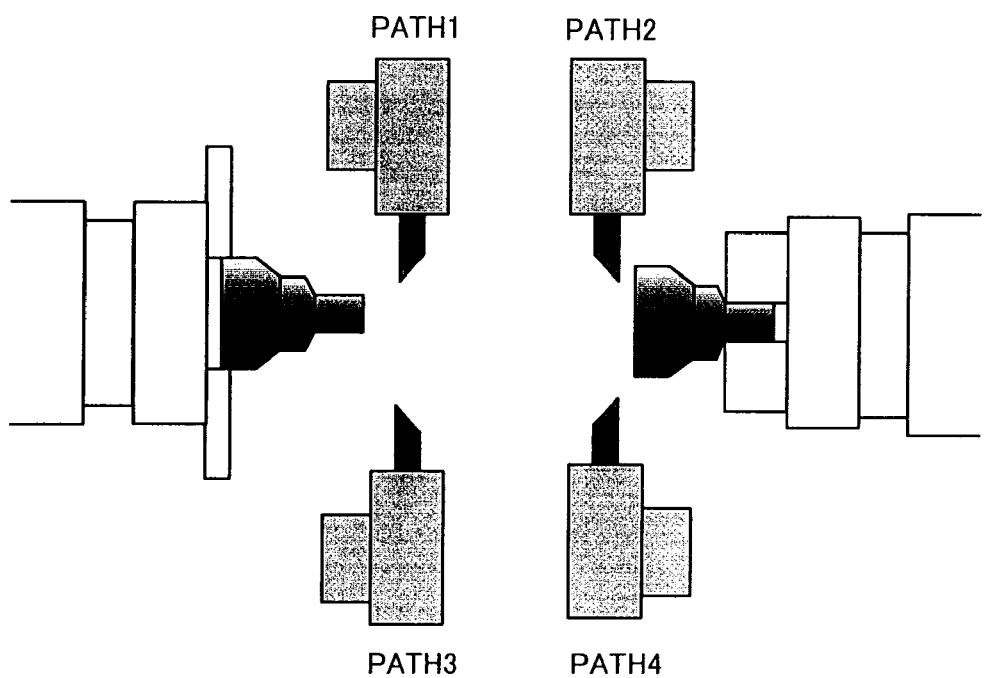
FIG. 4 illustrates a four-path lathe (two spindles)

FIGS. 1A-4 illustrate multi-path lathes. FIG. 1A illustrates a two-path lathe (one spindle), FIG. 1B illustrates a two-path lathe (one spindle) with a milling head, and FIG. 1C illustrates a two-path lathe (two spindles). FIG. 2A illustrates a two-path lathe (two spindles), and FIG. 2B illustrates a two-path lathe (two spindles) with a milling head. FIG. 3A illustrates a three-path lathe (two spindles), and FIG. 3B illustrates a three-path lathe (two spindles) with a milling head. FIG. 4 illustrates a four-path lathe (two spindles).

Figure 5:
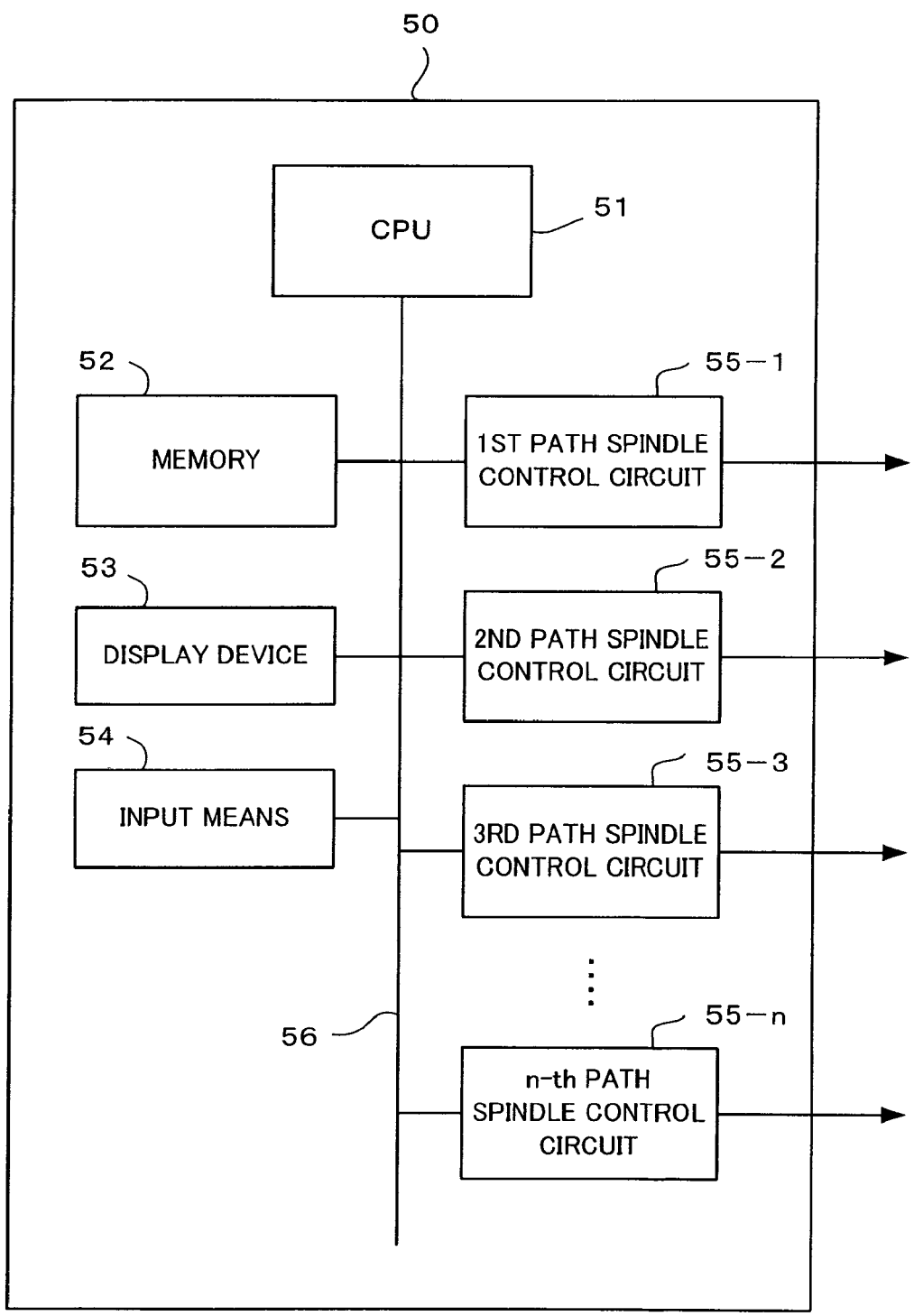
FIG. 5 is a schematic view of a numerical controller serving as the automatic programming device for a multi-path machine according to the present invention.

FIG. 5 is a schematic view of main units of a numerical controller serving as the automatic programming device for a multi-path machine according to the present invention. The numerical controller 50 can machine a workpiece by driving and controlling any of the multi-path lathes shown in FIGS. 1A-4 according to a machining program.

The numerical controller 50 includes a processor 51, a memory 52 such as ROM, RAM, non-volatile RAM, or the like, a display device 53 including a liquid crystal display device or the like, an input means 54 including a keyboard for inputting data and commands, and 1st to n-th path spindle control circuits 55-1 to 55-$n$ for controlling the motors for driving the movable shafts of a plurality of paths. The memory 52, display device 53, input means 54, and control circuits 55-1 to 55-$n$ are connected to the processor 51 via a bus 56.

The memory 52 stores, in addition to programs for each path, software for editing the programs and, in particular, software for the automatic programming for a multi-path machine according to the present invention.

The 1st to n-th path spindle control circuits 55-1 to 55-$n$ perform position/speed feedback control according to the moving commands distributed by the processor 51 executing the programs of individual paths and on the basis of feedback signals from position/speed sensors associated with the motors, and control the motors of individual paths by current feedback to move the spindles of individual paths separately or synchronously in a coordinated manner. This multi-path driving and control operation by the numerical controller 50 is the same as the driving and control operation by conventional numerical controllers having a multi-path control function. The automatic programming device according to the present invention may include an information processing device such as a personal computer.

Figures 6, 7:
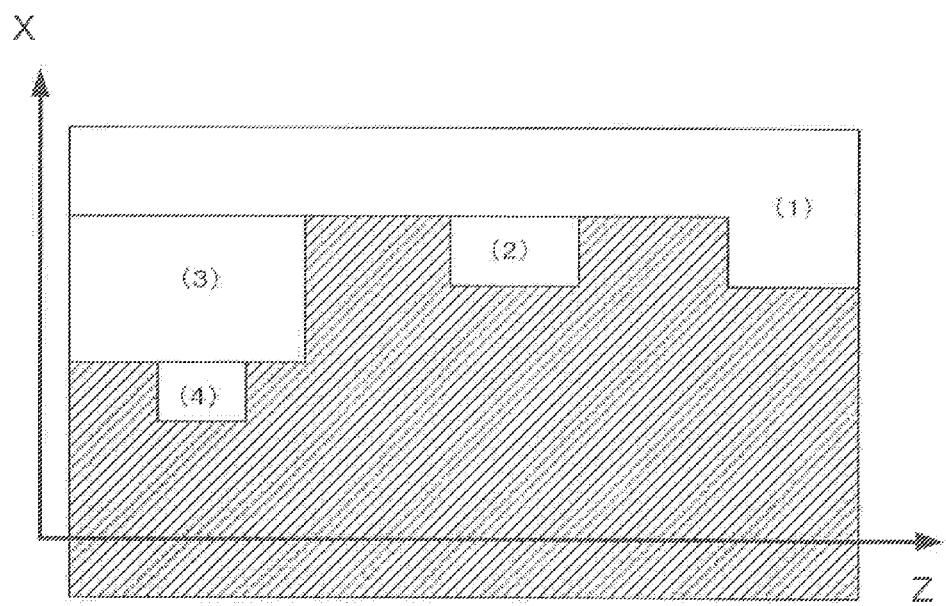
FIG. 6 illustrates regions to be machined in machining processes (1)-(4)
FIG. 7 illustrates condition to be input by an operator.

FIG. 6 illustrates regions of a workpiece to be machined by machining processes (1)-(4). Reference numerals (1)-(4) in FIG. 6 indicate a machining order of the workpiece. FIG. 6 shows an example of machining of a workpiece W using one of the two-path lathes shown in FIGS. 1A-1C and FIGS. 2A-2B in the machining processes (1)-(4).

As can be seen from FIG. 6, an operator should perform the machining process (2) after the machining process (1), perform the machining process (3) after the machining process (1), and perform the machining process (4) after the machining process (3). The operator can recognize that the machining process (2) can be performed simultaneously with the machining process (3) or (4), the machining process (3) can be performed simultaneously with the machining process (2), and the machining process (4) can be performed simultaneously with the machining process (2). The operator can also recognize which path should be used for each machining process depending on the machining types of individual machining processes.

FIG. 7 shows an example of input screen. As described with reference to FIG. 6, the operator can input conditions for workable orders of machining processes, paths workable for each of the machining processes, and data of simultaneously workable machining processes to the automatic programming device for creating multi-path programs (see FIG. 5). The automatic programming device for creating multi-path programs stores the information input by the operator in a storage device (memory 52 in FIG. 5).

NOs. (1), (2), (3), and (4) indicate the machining process numbers and "machining type" indicates the type of machining to be performed in each machining process.

For the conditions for performing machining processes, the workable orders are set for each machining process. The workable paths are set for each machining process. The data of simultaneously workable machining processes is stored.

In the exemplary input screen shown in FIG. 7, there are four "machining processes" and two "workable paths", i.e., paths 1 and 2. The number of "machining processes" is not limited, however, to four and the number of "workable paths" is not limited to paths 1 and 2.

As described above, FIG. 7 is an example of condition to be input to the automatic programming device for machining the workpiece W with a machine including paths 1 and 2 according to a machining program including four machining processes. If the number of machining processes increases or the number of paths in a machine increases, a corresponding input screen is displayed.

Figure 8:
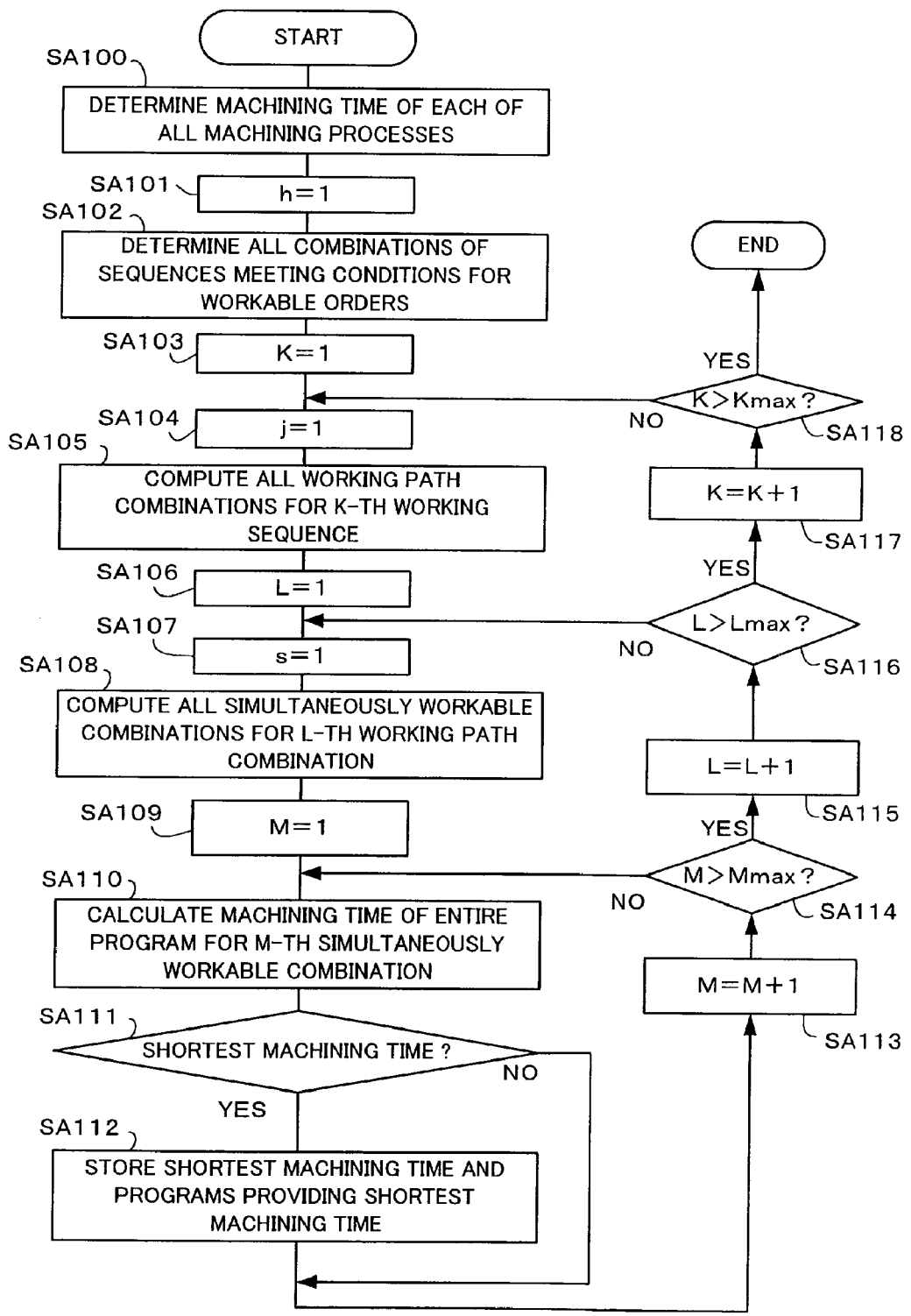
FIG. 8 is a flowchart illustrating an algorithm for the entire processing of automatic programming for creating a multi-path program.

FIG. 8 is a flowchart illustrating an algorithm for the entire processing of automatic programming for creating multi-path programs. This algorithm will now be described in the order of steps.

[Step SA100] Determine the machining time of each of all machining processes. The method of determining the machining time of each machining process on the basis of the moving speed of the movable shaft, machining distance, and other data is conventionally known, so detailed description thereof is omitted.

[Step SA101] Initialize 'h' indicating the nest counter and sequence number to 1 (h=1).

[Step SA102] Determine all the combinations of working sequences that meet the conditions for workable orders. More specifically, all the combinations of working sequences can be determined by the processing shown in the flowchart in FIG. 9.

[Step SA103] Set K=1. K indicates a sequence number that meets the conditions for workable orders.

[Step SA104] Initialize 'j' indicating the nest counter and sequence number to 1 (j=1).

[Step SA105] Compute all the combinations of working paths in the K-th working sequence. More specifically, all the combinations of working paths are computed by the processing shown in the flowchart in FIG. 11.

[Step SA106] Set L=1. L is the number of a working path combination in the K-th working sequence.

[Step SA107] Initialize 's' indicating the nest counter and sequence number to 1 (s=1).

[Step SA108] Compute all the combinations of simultaneously workable machining processes in the L-th combination of working paths. More specifically, all the combinations of simultaneously workable machining processes are computed by the processing shown in the flowchart in FIG. 13.

[Step SA109] Set M=1. M is the number of a simultaneously workable machining process combination in the L-th working path combination.

[Step SA110] Calculate the machining time of the entire program in the M-th simultaneously workable machining process combination.

[Step SA111] Check whether or not the machining time is shortest; if shortest, proceed to step SA112, if not, proceed to step SA113.

[Step SA112] Store the shortest machining time and the program that provides the shortest machining time.

[Step SA113] Add 1 to M to update M.

[Step SA114] Check whether or not M is greater than Mmax; if greater, proceed to step SA115; if not, proceed to step SA110.

[Step SA115] Add 1 to L to update L.

[Step SA116] Check whether or not L is greater than Lmax; if greater, proceed to step SA117; if not, proceed to step SA107.

[Step SA117] Add 1 to K to update K.

[Step SA118] Check whether or not K is greater than Kmax; if greater, end the processing; if not, proceed to step SA104 to continue the processing.

In the above flowchart, Kmax is the number of working sequences that meet the conditions for workable orders; Lmax is the number of working path combinations in a working sequence; and Mmax is the number of combinations of simultaneously workable machining processes.

Figure 9:
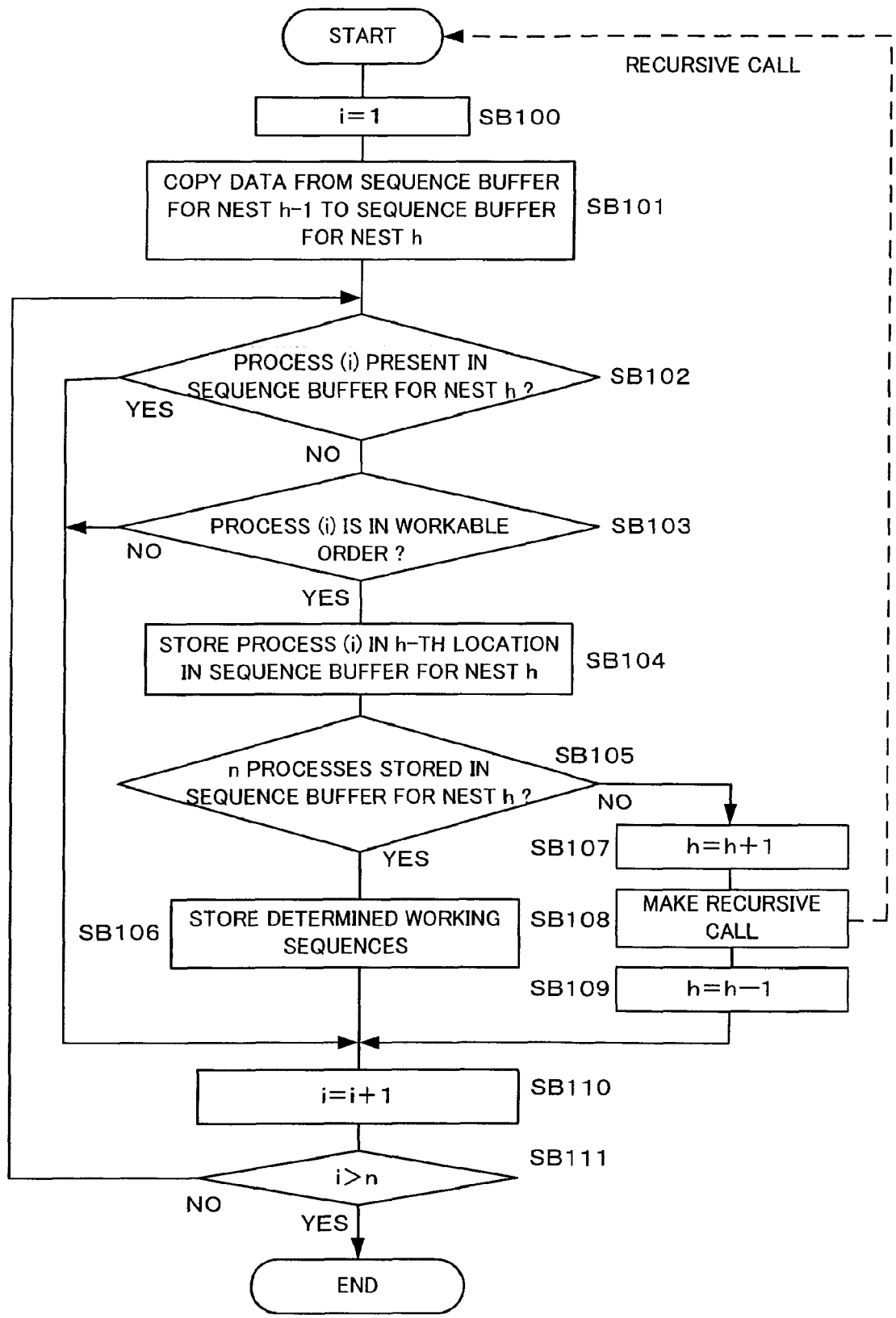
FIG. 9 is a flowchart illustrating an algorithm for the processing of determining all the combinations of working sequences that meet the conditions for workable orders.

FIG. 9 is a flowchart illustrating an algorithm for the processing of determining all the combinations of working sequences that meet the conditions for workable orders. This algorithm will now be described in the order of steps. Here, n is the total number of machining processes and h is the nest counter and sequence number.

[Step SB100] Initialize i indicating the machining process number to 1 (i=1).

[Step SB101] Copy data from the sequence buffer for nest h−1 to the sequence buffer for nest h. When h=1, there is no data to be copied, so the processing in this step is not performed.

[Step SB102] Check whether or not machining process (i) is present in the sequence buffer for nest h; if present, proceed to step SB110; if not, proceed to step SB103.

[Step SB103] Check whether or not machining process (i) is in a workable order; if in a workable order, proceed to step SB104; if not, proceed to step SB110.

[Step SB104] Store machining process (i) in the h-th location in the sequence buffer for nest h.

[Step SB105] Check whether or not n machining processes have been stored in the sequence buffer for nest h; if stored, proceed to step SB106; if not, proceed to step SB107.

[Step SB106] Store the determined working sequence.

[Step SB107] Add 1 to h to update h.

[Step SB108] Make a recursive call.

[Step SB10] Subtract 1 from h to update h.

[Step SB110] Add 1 to i to update i.

[Step SB111] Check whether or not i is greater than n; if greater, end the processing; if not, return to step SB102 to continue the processing, FIG. 10 illustrates inputs to the processing for executing the flowchart shown in FIG. 9, sequence buffers generated in storage areas, and storage areas for storing determined working sequences. "Inputs to processing" in FIG. 10(*a*) are data passed from the processing shown in the flowchart in FIG. 8 to the processing shown in the flowchart in FIG. 9. As shown in FIG. 10(*a*), the data input to the processing shown in the flowchart in FIG. 9 are n indicating the total number of machining processes, workable orders of machining processes, and h indicating the nest counter and sequence number. Shown in FIG. 10(*b*) are buffers generated during recursive processing in step SB108 in FIG. 9. Shown in FIG. 10(*c*) are storage areas in which the determined working sequences are stored in step SB106 in FIG. 9.

Figure 11:
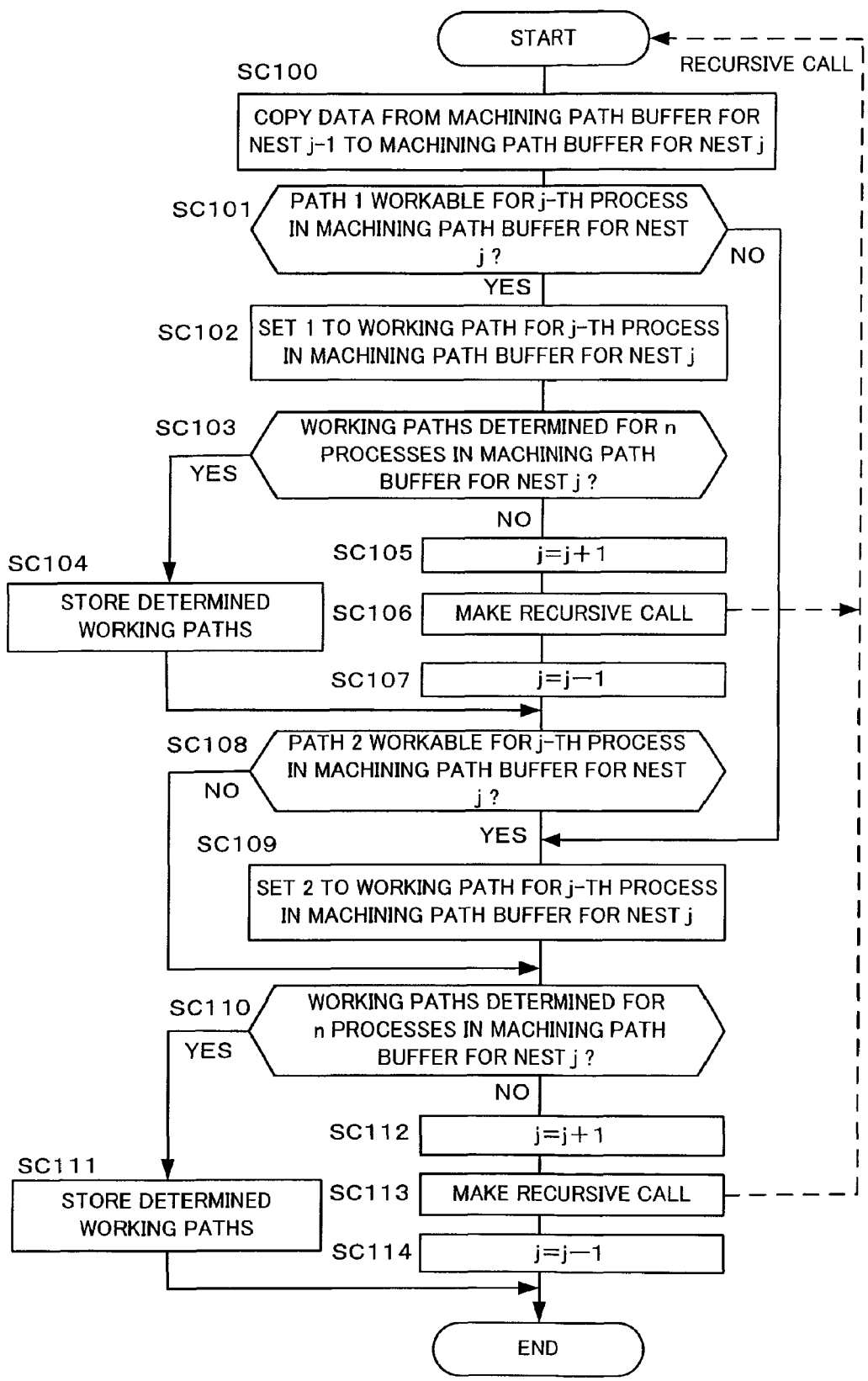
FIG. 11 is a flowchart illustrating an algorithm for the processing of computing combinations of paths working on the machining processes.

FIG. 11 is a flowchart illustrating an algorithm for the processing of computing combinations of working paths for the machining processes. This algorithm will now be described in the order of steps. Here, n is the total number of machining processes and j is the sequence number.

[Step SC100] Copy data from the machining path buffer for nest j−1 to the machining path buffer for nest j. When j=1, there is no data to be copied, so the processing in this step is not executed.

[Step SC101] Check whether or not the path 1 is workable for the j-th machining process in the machining path buffer for nest j; if workable, proceed to step SC102; if not, proceed to step SC109.

[Step SC102] Set 1 to the working path for the j-th machining process in the machining path buffer for nest j.

[Step SC103] Check whether or not working paths have been determined for n machining processes in the machining path buffer for nest j; if determined, proceed to step SC104; if not, proceed to step SC105.

[Step SC104] Store the determined working paths and proceed to step SC108.

[Step SC105] Add 1 to j to update j.

[Step SC106] Make a recursive call.

[Step SC107] Subtract 1 from j to update j.

[Step SC108] Check whether or not the path 2 is workable for the j-th machining process in the machining path buffer for nest j; if workable, proceed to step SC109; if not, proceed to step SC110.

[Step SC109] Set 2 to the working path for the j-th machining process in the machining path buffer for nest j.

[Step SC110] Check whether or not working paths have been determined for n machining processes in the machining path buffer for nest j; if determined, proceed to step SC111; if not, proceed to step SC112.

[Step SC111] Store the determined working paths.

[Step SC112] Add 1 to j to update j.

[Step SC113] Make a recursive call.

[Step SC114] Subtract 1 from j to update j and end the processing.

Shown in FIG. 12 are inputs to the processing for executing the flowchart shown in FIG. 11, working path buffers generated in storage areas, and storage areas for storing the determined working paths. "Inputs to processing" in FIG. 12(a) are data passed from the processing shown in the flowcharts in FIGS. 8 and 9 to the processing shown in the flowchart in FIG. 11. Shown in FIG. 12(b) are buffers generated during the recursive processing in steps SC106 and SC113 in FIG. 11. Shown in FIG. 12(c) are storage areas in which the determined working paths are stored in steps SC104 and SC111 in FIG. 11.

FIG. 13 is a flowchart illustrating an algorithm for the processing of computing all the combinations of machining processes that are simultaneously performed if possible with the previous and/or following step thereof. This algorithm will now be described in the order of steps. Here, n is the total number of machining processes and s is the sequence number.

[Step SD100] Copy data from the simultaneous machining buffer for nest s−1 to the simultaneous machining buffer for nest s.

[Step SD101] Check whether or not the s-th simultaneous machining process number in the simultaneous machining buffer for nest s has already been set; if already set, proceed to step SD111; if not, proceed to step SD102.

[Step SD102] Check whether or not the s-th and s−1-th machining processes in the simultaneous machining buffer for nest s are simultaneously workable; if simultaneously workable, proceed to step SD103; if not, proceed to step SD104.

[Step SD103] Set s−1 for the s-th simultaneous machining process number in the simultaneous machining buffer for nest s.

[Step SD104] Check whether or not simultaneous working of machining processes has been determined for n machining processes in the simultaneous machining buffer for nest s; if determined, proceed to step SD105; if not, proceed to step SD106.

[Step SD105] Store the determined combinations of simultaneously working machining processes.

[Step SD106] Add 1 to s to update s.

[Step SD107] Make a recursive call.

[Step SD108] Subtract 1 from s to update s.

[Step SD109] Check whether or not the s-th and s+1-th machining processes in the simultaneous machining buffer for nest s are simultaneously workable; if simultaneously workable, proceed to step SD110; if not, proceed to step SD111.

[Step SD110] Set s+1 for the s-th simultaneous machining process number in the simultaneous machining buffer for nest s.

[Step SD111] Check whether or not simultaneous working of machining processes has been determined for n machining processes in the simultaneous machining buffer for nest s; if determined, proceed to step SD112; if not, proceed to step SD113.

[Step SD112] Store the determined combinations of simultaneously working machining processes.

[Step SD113] Add 1 to s to update s.

[Step SD114] Make a recursive call.

[Step SD115] Subtract 1 from s to update s and end the processing.

FIG. 14 illustrates inputs to the processing for executing the flowchart shown in FIG. 13, a simultaneous machining buffer generated in a storage area, and a storage area for storing the determined simultaneously working machining processes. "Inputs to processing" in FIG. 14(a) are data passed from the processes shown in the flowcharts in FIGS. 8, 9, and 11 to the processing shown in the flowchart in FIG. 13. Shown in FIG. 14(b) is a buffer generated during the recursive processing in steps SD107 and SD114 in FIG. 13. Shown in FIG. 14(c) is a storage area in which the determined simultaneously working machining processes are stored in steps SD105 and SD112 in FIG. 13.

Next, the processing in FIGS. 8, 9, 11, and 13 will be described with reference to the examples shown in FIGS. 6, 7, and 15-19.

As described above, FIG. 6 shows how the workpiece W is machined in the machining processes (1)-(4). FIG. 7 illustrates the condition to be input to the automatic programming device (for example, to the numerical controller 50) for a multi-path machine for performing machining operations shown in FIG. 6. FIG. 7 illustrates the condition to be input by the operator. The operator inputs conditions for workable orders of machining processes, workable paths for each of the machining processes, and conditions for simultaneously workable machining processes.

FIG. 15 illustrates how all the combinations of working sequences that meet the conditions for workable orders are determined. Three working sequences indicated by reference numerals 1, 3, and 4 in FIG. 15 are determined to meet the conditions for workable orders of machining processes shown in FIG. 7 by the processing of algorithm shown in FIG. 9.

Next, the working sequences that meet the conditions for workable orders of machining processes are computed by the processing of algorithm shown in FIG. 11 and six path combinations shown in FIGS. 16(A)-(F) are determined to meet the conditions shown in FIG. 7. FIG. 16 illustrates how all the combinations of working paths for the machining processes are computed.

Reference numerals (1-1) and (1-2) in FIG. 16 indicate all the combinations of paths working on the machining processes in the sequence indicated by reference numeral 1 in FIG. 15. Reference numerals (3-1) and (3-2) indicate all the combinations of paths working on the machining processes in the sequence indicated by reference numeral 3 in FIG. 15. Reference numerals (4-1) and (4-2) indicate all the combinations of paths working on the machining processes in the sequence indicated by reference numeral 4 in FIG. 15.

Through the processing of algorithm shown in FIG. 13 on all the combinations of paths working on the machining processes shown in FIG. 16, the combinations indicated by reference numerals (1-1-1), (3-2-1), and (3-2-2) in FIG. 17 are determined to meet the conditions shown in FIG. 7.

Next, the processing of algorithm shown in FIG. 8 calculates the machining time of each of the machining processes indicated by reference numerals (1-1-1), (3-2-1), and (1-1-2) in FIG. 17. The calculation results are indicated by reference numerals (1-1-1-1), (3-2-1-1), and (1-1-2-2) in FIG. 18. The shortest machining time is provided by two machining programs of the sequences indicated by reference numerals (3-2-1-1) and (1-1-2-2) shown in FIG. 19.

The invention claimed is:

1. An automatic programming method of creating a multi-tool program for a machine having a plurality of tools and performing one or more machining processes of a machining program for machining a workpiece, the automatic programming method comprising:
- a first step of creating the machining processes for machining the workpiece;
- a second step of calculating a machining time of each of the machining processes;
- a third step of selecting a workable tool for each of the machining processes created in the first step;
- a fourth step of inputting a workable order of the machining processes;
- a fifth step of inputting, for each of the machining processes, a simultaneously workable machining process if any among the machining processes; and
- a sixth step of selecting a machining program that provides a shortest machining time from a plurality of programs, based on the machining processes created in the first step, the machining time calculated in the second step, the workable tool selected in the third step, the workable order input in the fourth step, and the simultaneously workable machining process input in the fifth step, the sixth step including
    - determining all combinations of working sequences that meet conditions for the workable order,
    - determining all combinations of simultaneous workable machining processes in each of the combinations of working sequences,
    - calculating a machining time of each of the combinations of working sequences including each of the combinations of simultaneous workable machining processes as a machining time of an entire machining program, and
    - selecting the machining program that provides the shortest machining time based on the calculated machining time of the entire machining program.

2. An automatic programming device for creating a multi-tool program for a machine that has a plurality of tools and is configured to perform one or more machining processes of a machining program for machining a workpiece, the automatic programming device comprising:
- a machining process creating unit configured to create the machining processes for machining the workpiece;
- a calculating unit configured to calculate a machining time of each of the machining processes;
- a tool selecting unit configured to select a workable tool for each of the machining processes created by the machining process creating unit;
- a machining order input unit configured to input a workable order of the machining processes;
- a simultaneously workable machining process input unit configured to input, for each of the machining processes, a simultaneously workable machining process if any among the machining processes; and
- a selecting unit configured to select a machining program that provides a shortest machining time from a plurality of programs, based on the machining processes created by the machining process creating unit, the machining time calculated by the calculating unit, the workable tool selected by the tool selecting unit, the workable order input by the machining order input unit, and the simultaneously workable machining process input by the simultaneously workable machining process input unit, wherein the selecting unit is configured to select the machining program that provides a shortest machining time by
- determining all combinations of working sequences that meet conditions for the workable order,
- determining all combinations of simultaneous workable machining processes in each of the combinations of working sequences,
- calculating a machining time of each of the combinations of working sequences including each of the combinations of simultaneous workable machining processes as a machining time of an entire machining program, and
- selecting the machining program that provides the shortest machining time based on the calculated machining time of the entire machining program.

* * * * *